United States Patent
Stanciu et al.

(10) Patent No.: US 9,853,787 B2
(45) Date of Patent: Dec. 26, 2017

(54) CARRIER FREQUENCY OFFSET ESTIMATION FOR WIRELESS COMMUNICATION

(71) Applicant: FREESCALE SEMICONDUCTOR, INC., Austin, TX (US)

(72) Inventors: Mihai-Ionut Stanciu, Bucharest (RO); Raja V. Tamma, Leander, TX (US); Khurram Waheed, Austin, TX (US)

(73) Assignee: NXP USA, INC., Austin, TX (US)

(*) Notice: Subject to any disclaimer, the term of this patent is extended or adjusted under 35 U.S.C. 154(b) by 93 days.

(21) Appl. No.: 14/835,437

(22) Filed: Aug. 25, 2015

(65) Prior Publication Data

US 2016/0381581 A1  Dec. 29, 2016

(30) Foreign Application Priority Data

Jun. 24, 2015  (RO) ..................................... 15-00435

(51) Int. Cl.
*H04W 24/08* (2009.01)
*H04L 5/00* (2006.01)
*H04W 84/12* (2009.01)

(52) U.S. Cl.
CPC ........... *H04L 5/0048* (2013.01); *H04W 84/12* (2013.01)

(58) Field of Classification Search
CPC .............................. H04W 24/08; H04W 84/12
USPC ........................................................ 370/252
See application file for complete search history.

(56) References Cited

U.S. PATENT DOCUMENTS

| | | | | |
|---|---|---|---|---|
| 5,909,471 | A * | 6/1999 | Yun .......................... | H04L 7/042 375/343 |
| 7,010,024 | B1 * | 3/2006 | Eerola .................. | H04B 1/7093 375/150 |
| 7,058,151 | B1 | 6/2006 | Kim | |
| 7,634,033 | B1 * | 12/2009 | Giallorenzi .......... | H04B 1/7075 375/131 |
| 7,889,782 | B2 | 2/2011 | Gorday et al. | |
| 9,031,124 | B1 * | 5/2015 | Bhat ................... | H04L 27/0014 375/229 |
| 9,729,195 | B2 | 8/2017 | Tamma et al. | |
| 2003/0058953 | A1* | 3/2003 | Lee ..................... | H04L 27/2675 375/260 |
| 2005/0105595 | A1 | 5/2005 | Martin et al. | |
| 2006/0203944 | A1* | 9/2006 | Kwak .................... | H04L 7/042 375/343 |
| 2007/0036248 | A1 | 2/2007 | Kumura | |
| 2008/0260076 | A1* | 10/2008 | Lai ..................... | H04L 27/2657 375/344 |

(Continued)

OTHER PUBLICATIONS

U.S. Appl. No. 14/306,692, Waheed, K. et al., "Techniques for Time-Domain Frame Synchronization of Packets", filed Jun. 7, 2014.

*Primary Examiner* — Mark Rinehart
*Assistant Examiner* — Peter G Solinsky

(57) ABSTRACT

Methods and system for carrier frequency offset (CFO) estimation are described. The method includes determining correlation values between a plurality of samples from a received signal and a plurality of reference signals corresponding to a plurality of CFO candidates. A set of correlation values which exceeds a threshold is determined and a corresponding CFO candidate for each correlation value in the set is selected. A CFO estimate based on an interpolation of selected CFO candidates is then calculated.

17 Claims, 3 Drawing Sheets

(56) References Cited

U.S. PATENT DOCUMENTS

| | | | |
|---|---|---|---|
| 2009/0149132 A1* | 6/2009 | LeFever | H04B 1/7075 455/67.11 |
| 2011/0013687 A1* | 1/2011 | Li | H04L 25/0216 375/232 |
| 2012/0014467 A1* | 1/2012 | Lindgren | H04L 27/266 375/260 |
| 2012/0169542 A1* | 7/2012 | Mathews | G01S 5/021 342/450 |
| 2013/0214976 A1* | 8/2013 | Michel | G01S 5/14 342/463 |
| 2014/0334531 A1* | 11/2014 | Jeckeln | H04L 25/06 375/240 |
| 2016/0246982 A1* | 8/2016 | Glenville | G06F 21/6218 |
| 2016/0286506 A1* | 9/2016 | Chae | H04W 56/002 |

* cited by examiner

CARRIER FREQUENCY OFFSET ESTIMATION FOR WIRELESS COMMUNICATION

BACKGROUND

Field

This disclosure relates generally to wireless communication, and more specifically, to carrier frequency offset (CFO) estimation for wireless communication.

Related Art

Deployment of Internet of Things (IoT) relies on networks of low-cost wireless devices that work reliably in the presence of interference. Internet of Things standards includes, for example, IEEE standard 802.15.4 (used by Zigbee and Thread standards). These standards use pseudo noise (PN) coding sequences over O-QPSK (offset quadrature phase shift keying. One disadvantage of O-QPSK is sensitivity to carrier frequency offset (CFO) between the transmitter and receiver. Poor CFO estimation results in poor demodulator performance in the presence of crystal frequency mismatches between various nodes in an IoT network. Various frequency offset estimation techniques are used to correct for CFO in the receiver. However, the various techniques can be complex and expensive in terms of hardware and memory usage.

Therefore, a need exists for a low-cost technique for frequency offset estimation that also provides good demodulator performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
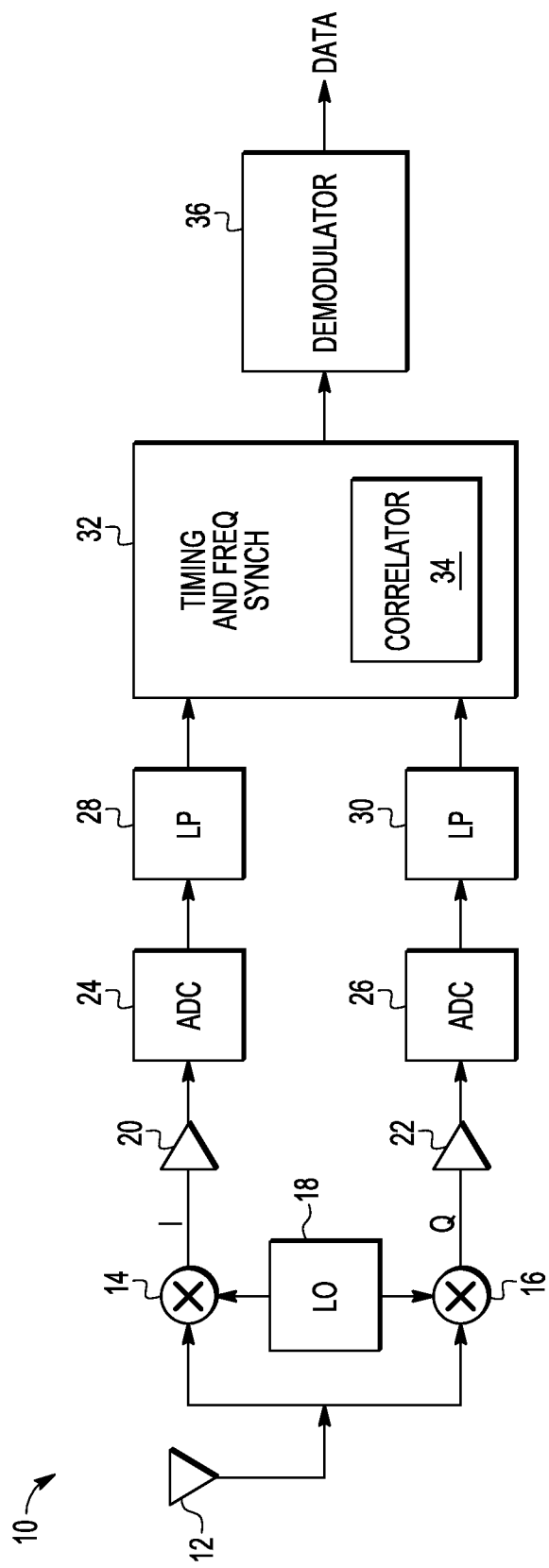
FIG. 1 illustrates, in block diagram form, a wireless receiver in accordance with an embodiment.

Generally, there is provided, a system and method for CFO estimation in a low cost wireless network. An estimation of CFO in a wireless receiver is determined using only preamble information of a received signal. The preamble is first detected by comparing correlation peaks to a threshold. A mean, or interpolation, of multiple CFO candidates is used to determine the CFO estimate. False CFO estimates are rejected through the use of an outlier detection mechanism. The method only requires storage of minimal information, allowing the size of buffers in the system to be minimized and to reduce cost. The method for CFO estimation in the receiver can be adapted to several wireless protocols that use auto-correlation preambles with a repetitive structure.

In one embodiment, there is provided, a method of carrier frequency offset (CFO) estimation, comprising: determining correlation values between a plurality of samples from a received signal and a plurality of reference signals, the plurality of reference signals corresponding to a plurality of CFO candidates; determining a set of correlation values which exceed a threshold; for each correlation value in the set, selecting a CFO candidate from the plurality of CFO candidates; and calculating a CFO estimate based on an interpolation of selected CFO candidates. Determining the set of correlation values may include determining at least three maximum correlation values spaced apart by a predetermined amount of time. The predetermined amount of time may be a duration of a synchronization symbol. The method may further comprise discarding an outlier selected CFO candidate before the step of calculating a CFO estimate, the discarding based on a difference between the outlier selected CFO candidate and a mean of at least two selected CFO candidates. The threshold may be based on a magnitude of a predetermined correlation value. The received signal may be characterized as a signal which follows an IEEE 802.15.4 protocol. The received signal may be characterized as a Zigbee signal. Determining a set of correlation values may further comprise detecting a preamble of the received signal. The method may further comprise storing selected CFO candidates in a buffer before calculating the CFO estimate.

In another embodiment, there is provided, a method of carrier frequency offset (CFO) estimation, comprising: receiving a plurality of samples of a signal; generating a plurality of reference signals; determining correlation values between the plurality of samples and the plurality of reference signals; determining a set of correlation values which exceed a predetermined threshold; using the set of correlation values, selecting a CFO candidate for each of three correlation values in the set; calculating a CFO estimate based on a mean of at least two selected CFO candidates. The three correlation values in the set may be three correlation values spaced apart by a predetermined amount of time. The method may further comprise: calculating a mean of the two latest selected CFO candidates; determining a difference between the mean and the earliest selected CFO candidate; and discarding a correlation value based on the difference. The received signal may be characterized as a signal which follows an IEEE 802.15.4 protocol. The received signal may be a constant envelope phase modulated signal. Determining a set of correlation values may further comprise detecting a preamble of the received signal. Generating a plurality of reference signals may include generating a plurality of reference signals corresponding to CFO candidates, the reference signals separated from each other in the frequency domain. Receiving a plurality of samples of a signal may be characterized as receiving a plurality of I and Q samples of a signal.

In yet another embodiment, there is provided, a system for estimating carrier frequency offset (CFO) comprising: a signal receiver for providing samples of a received signal; a reference signal generator for generating a plurality of reference signals; a correlator unit coupled to the signal receiver and to the reference signal generator, the correlator unit for determining correlation values between a plurality of samples from the received signal and the plurality of reference signals; and a logic unit coupled to receive an output of the correlator unit, the logic unit for selecting CFO candidates using correlation values which exceed a threshold and for interpolating between selected CFO candidates to generate a CFO estimate. Interpolating between selected CFO candidates to generate a CFO estimate includes discarding an outlier selected CFO candidate based on a difference between a mean of at least two selected CFO candidates and the outlier selected CFO candidate. The system may further comprise a buffer for storing selected CFO candidates before calculating the CFO estimate.

FIG. 1 illustrates, in block diagram form, a wireless receiver 10 in accordance with an embodiment. Receiver 10 is intended for use in a low cost IoT network and may comply with one of one several standards relevant to IoT such as an IEEE 802.15.4 standard, or the Bluetooth Low Energy (BLE) standard. Receiver 10 is coupled to an antenna 12 and includes mixers 14 and 16, local oscillator 18, amplifiers 20 and 22, analog-to-digital converters 24 and 26, low pass filters 28 and 30, timing and frequency synchronization block 32 and demodulator 36. Timing and frequency synchronization block 32 includes correlator 34. A radio frequency (RF) signal received at antenna 12 is split and provided to mixers 14 and 16 where the received signal is mixed with a local oscillator signal to produce in-phase (I) and quadrature (Q) components. The I and Q signals will then follow two paths to timing and frequency synchronization block 32. The I and Q components are amplified by amplifiers 20 and 22 and converted to digital signals using analog-to-digital converters 24 and 26. Digital low pass filters 28 and 30 will then down convert the I and Q signals to baseband. Timing and frequency synchronization block 32 provides symbol/chip synchronization and frequency/phase adjustment. Correlator 34 provides correlation as well as a preamble detection and a CFO estimation. Correlation values are determined between a plurality of received samples and a plurality of reference signals. The reference signals are generated in timing and frequency synchronization 32. A buffer is provided for storing various values such as selected CFO candidate values that are used to calculate a CFO estimate. The preamble is detected by taking a mean, or average, of multiple correlation peak values. Correlated values from correlator 34 may be used for the timing and frequency synchronization as well as for providing a likely mapping between processed symbols and symbols defined by an appropriate standard, such as IEEE standard 802.15.4. Preamble detection and CFO estimation will be discussed in more detail later. Demodulator 36 is an O-QPSK demodulator in the illustrated embodiment. The type of demodulation depends in part on the applicable standard.

Figure 2:
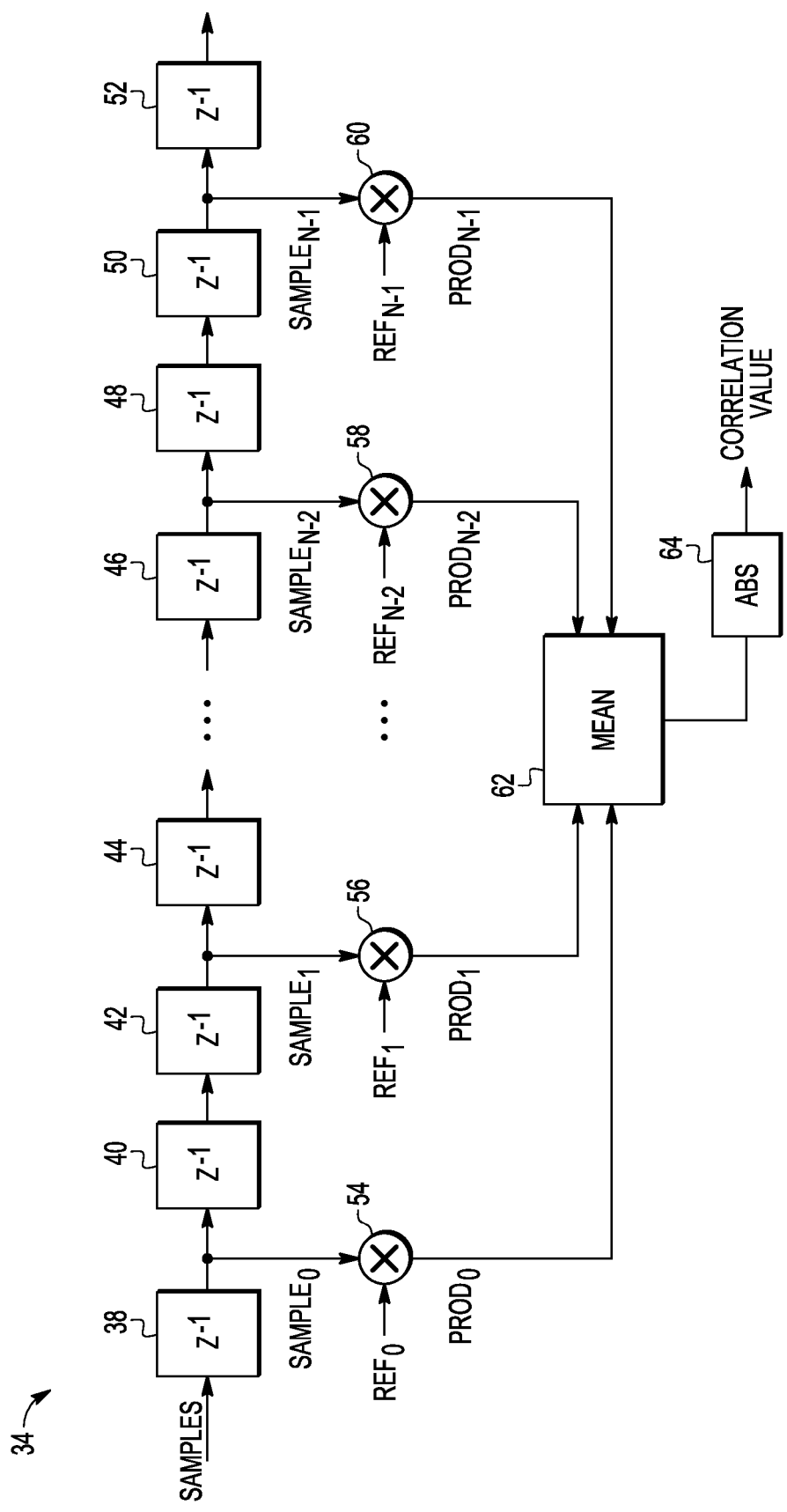
FIG. 2 illustrates, in block diagram form, a portion of the correlator of the wireless receiver of FIG. 1.

FIG. 2 illustrates, in block diagram form, a portion of correlator 34 of wireless receiver 10 of FIG. 1 in accordance with an embodiment. Correlator 34 includes delay elements 38, 40, 42, 44, 46, 48, 50, and 52, multipliers 54, 56, 58, and 60, mean unit 62, and absolute value unit 64. Delay elements 38, 40, 42, 44, 46, 48, 50, and 52 are connected together in series with an output of a preceding delay element connected to an input of a following delay element. A series of samples labeled "SAMPLES" are provided to the input of first delay element 38. A multiplier is connected to the output of selected delay elements. For example, multiplier 54 has an input connected to the output of delay element 38 for receiving a sample labeled "SAMPLE 0" and multiplier 56 has an input connected to the output of delay element 42 for receiving a sample labeled "SAMPLE 1". The number of delay elements depends on the standard. For example, for IEEE 802.15.4, sixty four (64) delay elements are required. Each multiplier multiplies a received sample with a reference signal. For example, multiplier 54 multiples sample SAMPLE 0 with REF 0 to generate a result labeled "PROD 0". An output of each of the multipliers is provided to an input of mean unit 62. An output of mean unit 62 is provided to an input of absolute value unit 64. Note that in another embodiment, absolute value unit 64 may be replaced with an absolute-squared value unit. During normal operation, absolute value unit 64 provides correlation values labeled "CORRELATION VALUE". To avoid complex multiplications the correlation operation may be performed in the phase domain if the input signal is of constant envelope. An algorithm that is used for timing and frequency synchronization may be used for signals not having constant envelope. However, the phase domain processing may be usable only for constant envelope signals. A logic unit coupled to the output of correlator 34 in timing and frequency synchronization block 32 is used to select CFO candidates using correlation values that exceed a threshold and for calculating a mean between selected CFO candidates to generate the CFO estimate.

Figure 3:
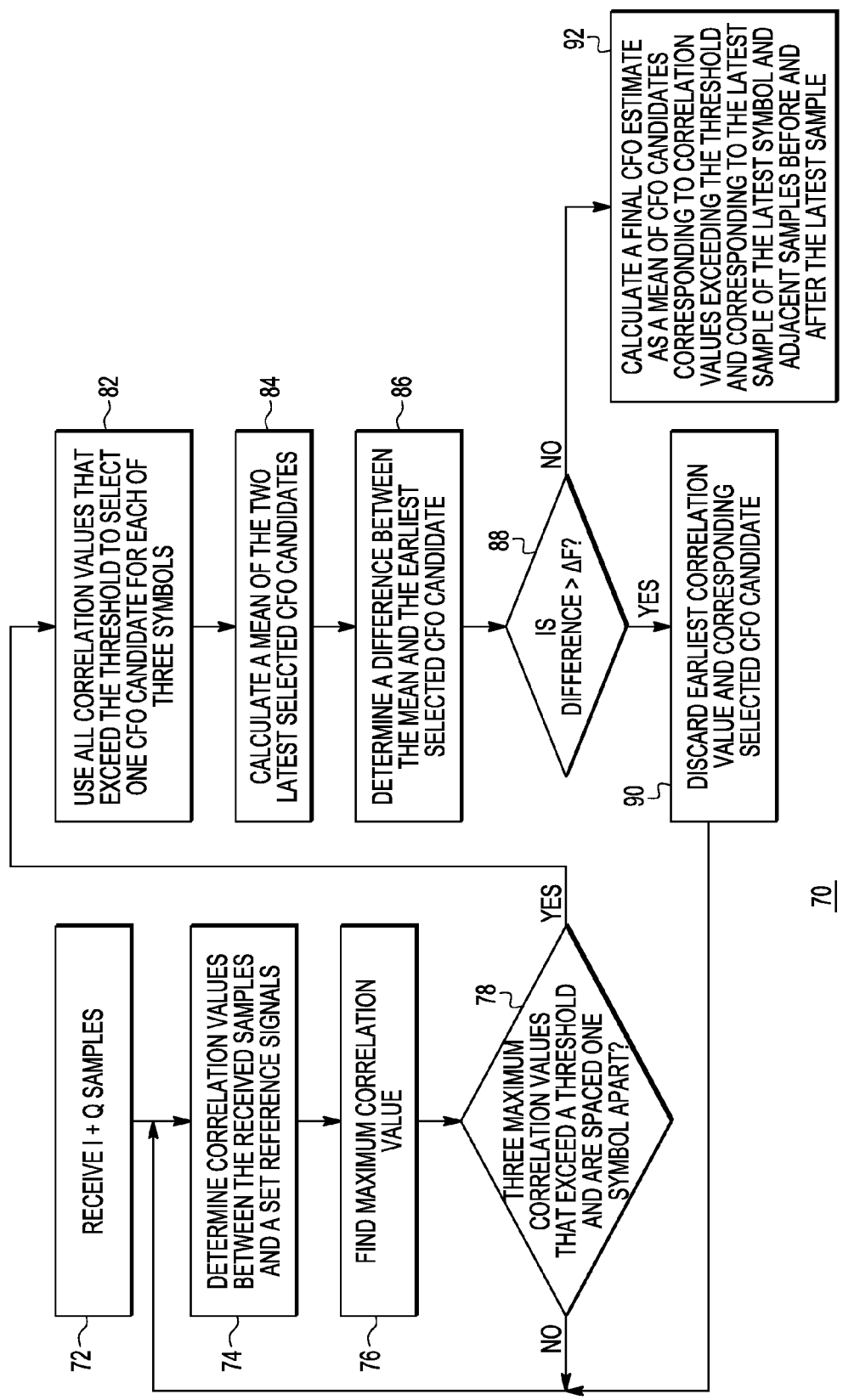
FIG. 3 illustrates a method for carrier frequency offset estimation in the correlator of FIG. 2.

FIG. 3 illustrates method 70 for CFO estimation in timing and frequency synchronization block 32 of FIG. 1 and correlator 34 of FIG. 2. Method 70 starts at step 72. At step 72, I and Q samples are received from low pass filters 28 and 30. The received samples may be constant envelope phase modulated signals. In one embodiment, the received samples may be signals that follow an IEEE 802.15.4 protocol. At step 74, correlation values are determined between the received samples and a set of reference signals. The reference signals are determined by the applicable standard. In one embodiment, the reference signals are equally spaced in the frequency domain. At step 76, maximum correlation values are determined from the correlation values determined in step 74. At decision step 78, it is determined if there are three maximum correlation values that exceed a threshold value and are spaced a predetermined amount of time apart. The threshold may be based on a magnitude of a predetermined correlation value. In one embodiment, the predetermined amount of time may be one synchronization symbol apart. If it is determined that there are not three maximum correlation values that exceed the threshold, then a preamble has not yet been detected and the NO path is taken from decision step 78 to the top of step 74 and steps 74, 76, and 78 are repeated until a preamble is detected. If it is determined that there are three maximum correlation values that exceed the threshold, then a preamble for a frame of data has been detected, and the YES path is taken to step 82. At step 82, all of the correlation values that were determined in step 74 to exceed the threshold are used to select one CFO candidate for each of the three symbols. The selected CFO candidates are used to determine the final CFO estimate. At step 84, a mean, or average, or interpolation, of the latest selected CFO candidates selected in step 82 is calculated. At step 86, a difference is calculated between the mean calculated in step 84 and an earliest selected CFO candidate. At decision step 88, it is determined if the difference calculated at step 86 is greater than a predetermined frequency difference (ΔO). If yes, the earliest CFO candidate is determined to be an outlier, and the YES path is taken to step 90. At step 90, the earliest correlation value and the corresponding selected CFO candidate is discarded because it is determined to be an outlier. An outlier CFO candidate is a selected CFO candidate that is distant from the CFO candidates selected in step 82 by the predetermined frequency difference (Δf). After detecting outliers at step 90, the method repeats starting at step 74. At decision step 88, if the difference is less than the predetermined frequency difference, then the earliest selected CFO candidate is not an outlier as defined above and the method continues at step 92. At step 92, a final CFO estimate is calculated as a mean, or interpolation, of the CFO candidates corresponding to correlation values exceeding the threshold defined in decision step 78 and corresponding to the latest sample of the latest symbol and adjacent samples before and after the latest sample. The CFO candidates are stored in a buffer before calculating the CFO estimate.

The method determines a CFO estimate in a low cost IoT wireless network in the presence of interference with good sensitivity. The method may be adapted to work with various wireless protocols that use auto-correlation preambles with a repetitive structure such as IEEE 802.15.4g, IEEE 802.15.4k, IEEE 802.15.4m.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of carrier frequency offset (CFO) estimation, comprising:
   determining correlation values between a plurality of samples from a received signal and a plurality of reference signals, the plurality of reference signals corresponding to a plurality of CFO candidates;
   determining a set of correlation values which exceed a threshold;
   for each correlation value in the set, selecting a CFO candidate from the plurality of CFO candidates; and
   calculating a CFO estimate based on an interpolation of selected CFO candidates; and
   further comprising discarding an outlier selected CFO candidate before the step of calculating a CFO estimate, the discarding based on a difference between the outlier selected CFO candidate and a mean of at least two selected CFO candidates.

2. The method of claim 1, wherein determining the set of correlation values includes determining at least three maximum correlation values spaced apart by a predetermined amount of time.

3. The method of claim 2, wherein the predetermined amount of time is a duration of a synchronization symbol.

4. The method of claim 1, wherein the threshold is based on a magnitude of a predetermined correlation value.

5. The method of claim 1, wherein the received signal is characterized as a signal which follows an IEEE 802.15.4 protocol.

6. The method of claim 1, wherein the received signal is characterized as a Zigbee signal.

7. The method of claim 1, wherein determining a set of correlation values further comprises detecting a preamble of the received signal.

8. The method of claim 1, further comprising storing selected CFO candidates in a buffer before calculating the CFO estimate.

9. A method of carrier frequency offset (CFO) estimation, comprising: receiving a plurality of samples of a signal;
   generating a plurality of reference signals; determining correlation values between the plurality of samples and the plurality of reference signals; determining a set of correlation values which exceed a predetermined threshold; using the set of correlation values, selecting a CFO candidate for each of three correlation values in the set; and
   calculating a CFO estimate based on a mean of at least two selected CFO candidates;
   calculating a mean of the two latest selected CFO candidates;
   determining a difference between the mean and the earliest selected CFO candidate; and
   discarding a correlation value based on the difference.

10. The method of claim 9, wherein the three correlation values in the set are three correlation values spaced apart by a predetermined amount of time.

11. The method of claim 9, wherein the received signal is characterized as a signal which follows an IEEE 802.15.4 protocol.

12. The method of claim 9, wherein the received signal is a constant envelope phase modulated signal.

13. The method of claim 9, wherein determining a set of correlation values further comprises detecting a preamble of the received signal.

14. The method of claim 9, wherein generating a plurality of reference signals includes generating a plurality of reference signals corresponding to CFO candidates, the reference signals separated from each other in the frequency domain.

15. The method of claim 9, wherein receiving a plurality of samples of a signal is characterized as receiving a plurality of I and Q samples of a signal.

16. A system for estimating carrier frequency offset (CFO) comprising:
   a signal receiver for providing samples of a received signal;
   a reference signal generator for generating a plurality of reference signals;
   a correlator unit coupled to the signal receiver and to the reference signal generator, the correlator unit for determining correlation values between a plurality of samples from the received signal and the plurality of reference signals; and
   a logic unit coupled to receive an output of the correlator unit, the logic unit for selecting CFO candidates using correlation values which exceed a threshold and for interpolating between selected CFO candidates to generate a CFO estimate; and
   wherein interpolating between selected CFO candidates to generate a CFO estimate includes discarding an outlier selected CFO candidate based on a difference between a mean of at least two selected CFO candidates and the outlier selected CFO candidate.

17. The system of claim 16, further comprising a buffer for storing selected CFO candidates before calculating the CFO estimate.

\* \* \* \* \*